United States Patent
Okajima

(10) Patent No.: US 6,701,396 B2
(45) Date of Patent: Mar. 2, 2004

(54) DATA BURST TRANSFER CIRCUIT, PARALLEL-SERIAL AND SERIAL-PARALLEL CONVERSION CIRCUITS, AND AN OSCILLATION CIRCUIT

(75) Inventor: Yoshinori Okajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 441 days.

(21) Appl. No.: 09/820,716

(22) Filed: Mar. 30, 2001

(65) Prior Publication Data

US 2001/0054122 A1 Dec. 20, 2001

(30) Foreign Application Priority Data

Jun. 16, 2000 (JP) ........................................ 2000-181521

(51) Int. Cl.[7] .............................................. G06F 13/12
(52) U.S. Cl. .............................. 710/71; 710/35; 331/45
(58) Field of Search ............................ 710/35, 100, 71; 713/500, 400; 331/45

(56) References Cited

U.S. PATENT DOCUMENTS

| | | | | |
|---|---|---|---|---|
| 5,798,720 A | * | 8/1998 | Yano | 341/101 |
| 6,154,246 A | * | 11/2000 | Ogasawara et al. | 347/250 |
| 6,185,693 B1 | * | 2/2001 | Garmire et al. | 710/61 |
| 6,301,066 B1 | * | 10/2001 | Uno | 360/45 |
| 6,330,650 B1 | * | 12/2001 | Toda et al. | 710/35 |
| 6,335,696 B1 | * | 1/2002 | Aoyagi et al. | 341/100 |
| 6,469,583 B1 | * | 10/2002 | Usui | 331/1 A |

* cited by examiner

*Primary Examiner*—Kim Huynh
(74) *Attorney, Agent, or Firm*—Arent Fox Kintner Plotkin & Kahn, PLLC

(57) ABSTRACT

The asynchronous data burst transfer circuit includes a data burst transfer oscillation circuit which outputs n strobe signals of mutually different phases, plural parallel-serial conversion circuits which convert n-bit parallel signals into serial signals, and plural serial-parallel conversion circuits which convert serial signals into n-bit parallel signals. The parallel-serial conversion circuits convert every n-bit parallel signals of data read from a memory into serial signals based on the strobe signals, and transfer the serial signals. The serial-parallel conversion circuits convert the received serial signals into n-bit parallel signals based on the strobe signals, thereby obtaining the parallel signals as the original data.

10 Claims, 7 Drawing Sheets

(WHEN CMD = 111···1 IS A READ COMMAND)

DATA BURST TRANSFER CIRCUIT, PARALLEL-SERIAL AND SERIAL-PARALLEL CONVERSION CIRCUITS, AND AN OSCILLATION CIRCUIT

FIELD OF THE INVENTION

The present invention in general relates to a data burst transfer between two memory chips on a board or a data burst transfer between two memory circuits on a chip. More particularly, this invention relates to a data burst transfer circuit for carrying out a high-speed data transfer without synchronizing data with a clock signal, and a parallel-serial conversion circuit, a serial-parallel conversion circuit, and an oscillation circuit that can be used for the data burst transfer circuit.

BACKGROUND OF THE INVENTION

Conventionally, a data transfer has been carried out between memory chips or between memory circuits in synchronism with a clock signal. Therefore, when a clock frequency is slow, the transfer of all data becomes very slow. In order to transfer all data at a high speed when the clock frequency is slow, it is necessary to extremely increase the number of lines for connecting between the memories.

However, the increasing the number of lines for connecting between the memories leads to an increase in the size of a wiring area, which is not preferable. Therefore, when the clock frequency is slow, there may be considered a method of transferring data in synchronism with a high-speed clock signal by generating this high-speed clock using a PLL. However, the provision of the PLL has a problem of making complex the circuit, although it is not necessary to increase the number of lines in this case.

SUMMARY OF THE INVENTION

It is an object of the present invention to provide a data burst transfer circuit capable of decreasing the number of lines for connecting between memory chips or between memory circuits and also capable of transferring data at a higher speed, and to provide a parallel-serial conversion circuit, a serial-parallel conversion circuit, and an oscillation circuit that can be used for this data burst transfer circuit.

According to one aspect of the present invention, timing signals (strobe signals) having a plurality of phases are generated based on a signal of a higher frequency than that of a clock signal. A memory at a data transfer origin converts data to be transferred from a parallel signal into a serial signal for each plurality of bits based on the generated strobe signals. This memory then transmits the serial signals to a memory at a data transfer destination via separate signal lines. The memory at the data transfer destination converts the received serial signals into parallel signals based on the strobe signals, thereby returning the data to the original data, and stores this data.

Other objects and features of this invention will become apparent from the following description with reference to the accompanying drawings.

DESCRIPTION OF THE PREFERRED EMBODIMENTS

Preferred embodiment of the present invention will be explained in detail below with reference to the drawings.

Figure 1:
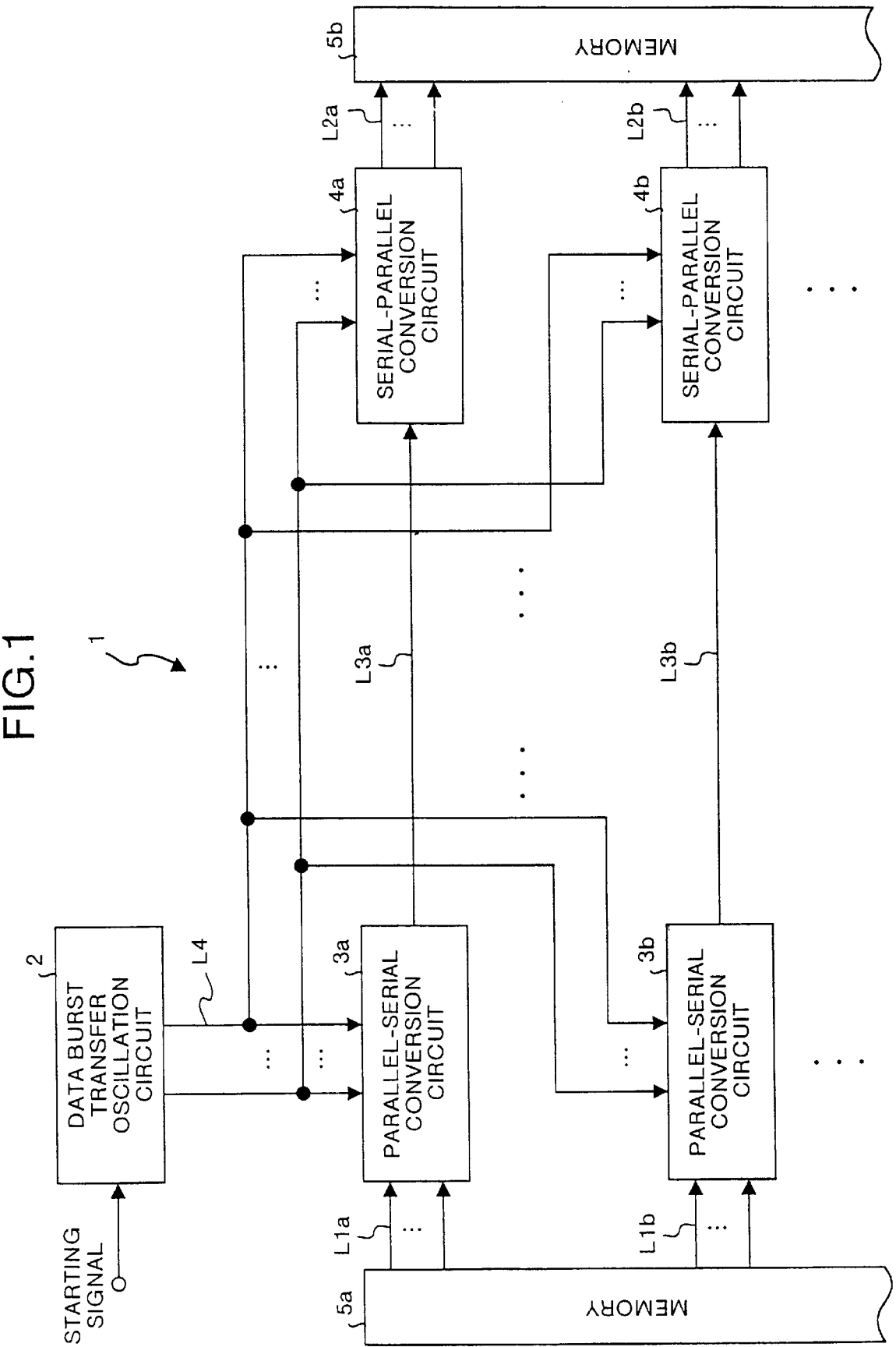
FIG. 1 is a block diagram for explaining the principle of the present invention.

FIG. 1 is a block diagram for explaining the principle of an asynchronous data burst transfer circuit relating to the present invention. This asynchronous data burst transfer circuit 1 includes a data burst transfer oscillation circuit 2 for outputting n (where n is an integer of 2 or above) strobe signals of mutually different phases, one or a plurality of parallel-serial conversion circuits 3a and 3b for converting n-bit parallel signals into serial signals, and one or a plurality of serial-parallel conversion circuits 4a and 4b for converting serial signals into n-bit parallel signals.

The parallel-serial conversion circuits 3a and 3b are connected to a memory chip or a memory circuit (hereinafter to be collectively referred to as a memory) 5a by signal line groups L1a and L1b consisting of n signal lines respectively. The serial-parallel conversion circuits 4a and 4b are connected to a memory 5b by signal line groups L2a and L2b consisting of n signal lines respectively. In this case, a memory refers to a data memory circuit including a register file, a FIFO, a RAM, a ROM, etc.

The parallel-serial conversion circuit 3a is connected to the serial-parallel conversion circuit 4a by one signal line L3a, and the parallel-serial conversion circuit 3b is connected to the serial-parallel conversion circuit 4b by one signal line L3b. The data burst transfer oscillation circuit 2 supplies n strobe signals of mutually different phases to the parallel-serial conversion circuits 3a and 3b and the serial-parallel conversion circuits 4a and 4b respectively via a signal line group L4 consisting of n signal lines.

The operation of the asynchronous data burst transfer circuit 1 having the above-described structure will be explained below. When a read instruction for reading data from the memory 5a at the data transfer origin has been issued, a starting signal is input from the outside to the data burst transfer oscillation circuit 2. Further, based on a generation of the read instruction, the corresponding data is read from the memory 5a.

Upon receiving the starting signal, the data burst transfer oscillation circuit 2 generates n strobe signals of mutually different phases. The generated strobe signals are supplied to the parallel-serial conversion circuits 3a and 3b and the serial-parallel conversion circuits 4a and 4b respectively.

The parallel-serial conversion circuits 3a and 3b convert every n-bit parallel signals of the data read from the memory 5a into serial signals based on the n strobe signals. The serial signals obtained by conversion are transferred to the serial-parallel conversion circuits 4a and 4b via the signal lines L3a and L3b respectively.

The serial-parallel conversion circuits 4a and 4b receive the serial signals transferred from the parallel-serial conversion circuits 3a and 3b respectively. Then, the serial-parallel conversion circuits 4a and 4b convert the serial signals into n-bit parallel signals based on then strobe signals supplied from the data burst transfer oscillation circuit 2.

The data obtained by the conversion into the parallel signals is written into the corresponding memory 5b at the data transfer destination according to a write instruction for writing the data into the memory 5b. In this way, the data of n×m bits (where m is an integer of 1 or above) has been transferred from the memory 5a at the data transfer origin to the memory 5b at the data transfer destination.

According to the present invention, every n-bit parallel signals of the (n×m)-bit data read from the memory 5a at the data transfer origin are converted into serial signals. These serial signals are transferred via the separate signal lines L3a and L3b. Then, the memory 5b at the data transfer destination converts the serial signals into the original n-bit parallel signals, and stores a result as the (n×m)-bit data into the memory 5b at the data transfer destination. Therefore, the number of lines for connecting between the memories 5a and 5b is decreased to approximately one n-th of the conventional number of lines. Further, it becomes possible to transfer bit data of a large capacity in a short time (faster than the clock signals) in a system having only slow clock signals.

A case will be assumed here in which, in an asynchronous data burst transfer circuit, every four-bit parallel signal of the data read from a memory are converted into serial signals, which are then transferred, and the received serial signals are converted into every four-bit parallel signals again.

Figure 2:
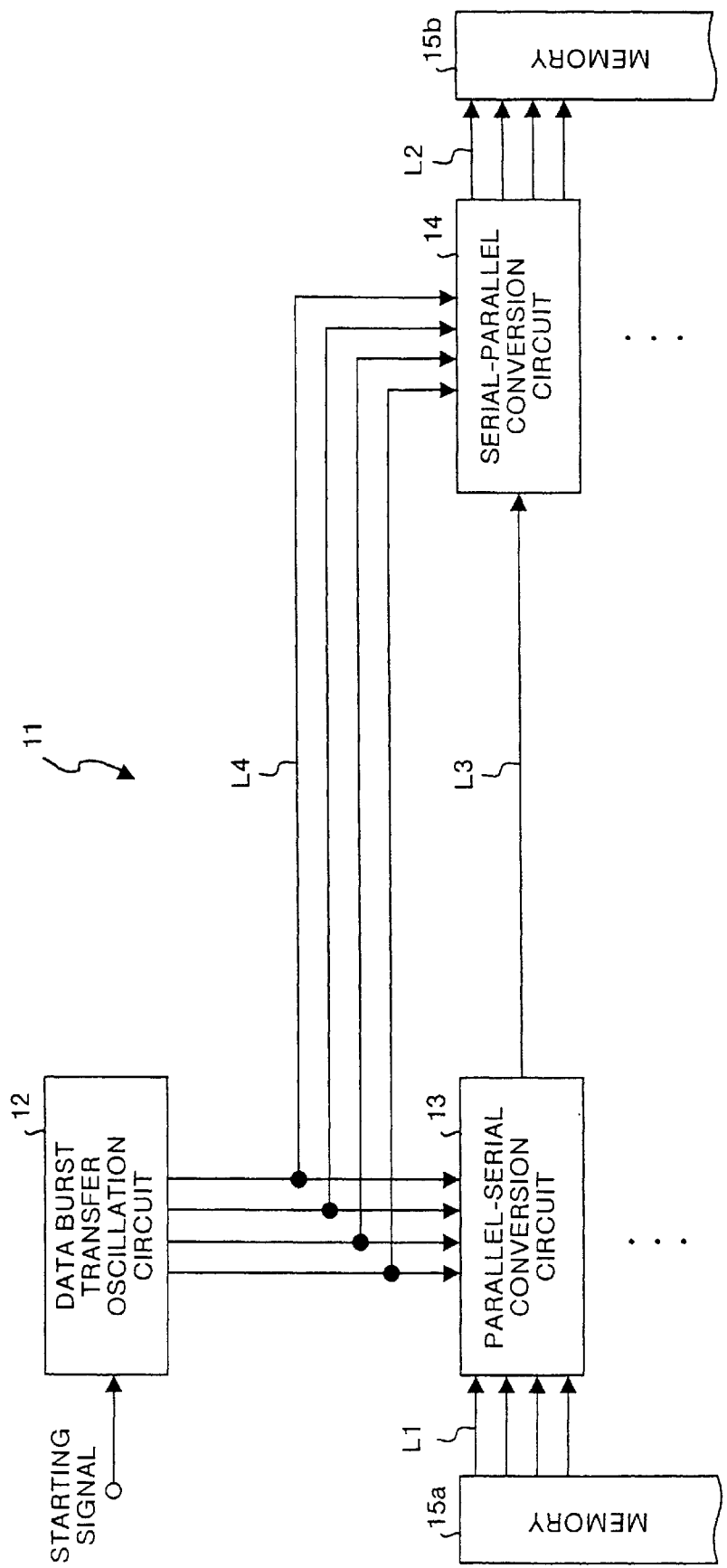
FIG. 2 is a block diagram showing a total structure of an asynchronous data burst transfer circuit relating to an embodiment of the present invention.

The block diagram in FIG. 2 shows an entire structure of an asynchronous data burst transfer circuit relating to one embodiment of the present invention. This asynchronous data burst transfer circuit 11 includes a data burst transfer oscillation circuit 12 for outputting four strobe signals of mutually different phases, a plurality of parallel-serial conversion circuits 13 (only one parallel-serial conversion circuit is shown in FIG. 2, for convenience sake) for converting four-bit parallel signals into serial signals, and a plurality of serial-parallel conversion circuits 14 (only one serial-parallel conversion circuit is shown in FIG. 2 for convenience sake) for converting serial signals into four-bit parallel signals.

The parallel-serial conversion circuit 13 is connected to a memory 15a by a signal line group L1 consisting of four signal lines. The serial-parallel conversion circuit 14 is connected to a memory 15b by a signal line group L2 consisting of four signal lines.

The parallel-serial conversion circuit 13 is connected to the serial-parallel conversion circuit 14 by one signal line L3. The data burst transfer oscillation circuit 12 supplies four strobe signals of mutually different phases to the parallel-serial conversion circuit 13 and the serial-parallel conversion circuit 14 respectively via a signal line group L4 consisting of four signal lines.

Based on the four strobe signals, the parallel-serial conversion circuit 13 converts parallel signals into serial signals, and the serial-parallel conversion circuit 14 converts serial signals into parallel signals respectively. Other parallel-serial conversion circuits and serial-parallel conversion circuits not shown also have similar structures and similar operation to the above. Therefore, common strobe signals are supplied to the parallel-serial conversion circuit 13 and the serial-parallel conversion circuit 14 shown in FIG. 2 and to other parallel-serial conversion circuits and serial-parallel conversion circuits not shown that are used for transferring the same data.

Figure 3:
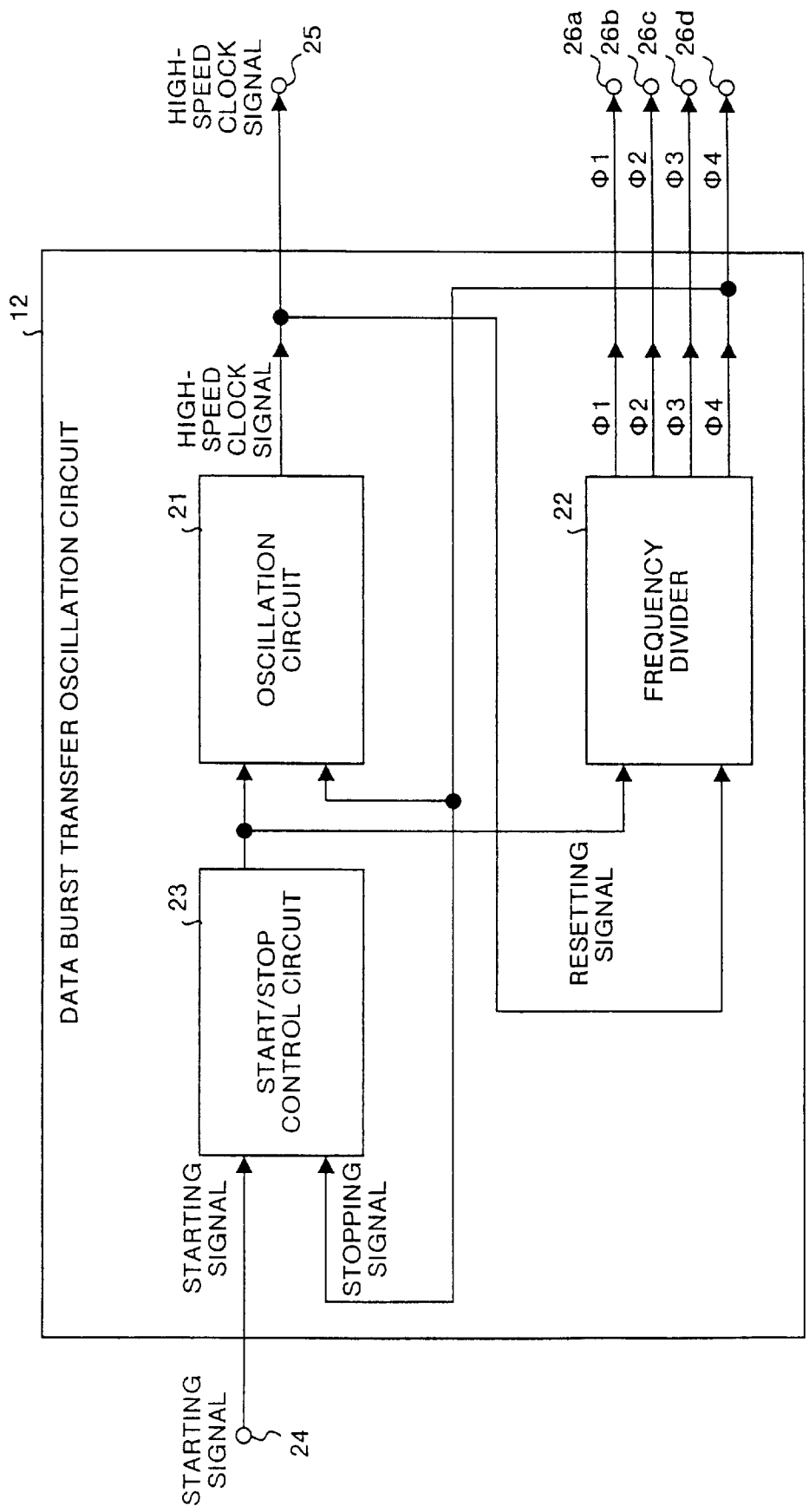
FIG. 3 is a block diagram showing one example of a structure of a data burst transfer oscillation circuit in the embodiment.

The block diagram in FIG. 3 shows one example of a structure of the data burst transfer oscillation circuit 12. The data burst transfer oscillation circuit 12 includes an oscillation circuit 21, a frequency divider 22, and a control circuit 23.

The data burst transfer oscillation circuit 12 is supplied with a starting signal from the outside via a starting signal input terminal 24. The data burst transfer oscillation circuit 12 outputs a high-speed clock signal and four strobe signals Ø1, Ø2, Ø3 and Ø4 to the outside via a high-speed clock output terminal 25 and the strobe signal output terminals 26a, 26b, 26c and 26d respectively.

The control circuit 23 is input with the starting signal from the starting signal input terminal 24. The control circuit 23 is input with the fourth strobe signal Ø4 as a stopping signal output from the frequency divider 22. The control circuit 23 outputs a control signal for starting the operation to the oscillation circuit 21 and the frequency divider 22 respectively. When the pulse of the fourth strobe signal Ø4 is extinguished, the control circuit 23 becomes in a state of waiting for an input of the next starting signal. In other words, the control circuit 23 does not receive the next starting signal before the pulse of the fourth strobe signal Ø4 is extinguished.

The oscillation circuit 21 is supplied with a control signal from the control circuit 23, and is also input with the fourth strobe signal Ø4 that has been output from the frequency divider 22. When the starting signal has been input to the control circuit 23, the oscillation circuit 21 starts oscillation at a frequency higher than that of a reference clock signal. The oscillation circuit 21 outputs a high-speed clock signal to the high-speed clock output terminal 25, and also supplies this high-speed clock signal to the frequency divider 22. When the pulse of the fourth strobe signal Ø4 has been supplied to the control circuit 23, the oscillation circuit 21 stops the oscillation.

The frequency divider 22 is supplied with the control signal from the control circuit 23, and is also input with the high-speed clock signal that has been output from the oscillation circuit 21. When the starting signal has not been input to the control circuit 23, the frequency divider 22 becomes in a reset state. When the starting signal has been input to the control circuit 23, the frequency divider 22 divides the frequency of the high-speed clock signal, and generates the first strobe signal Ø1, the second strobe signal Ø2, the third strobe signal Ø3, and the fourth strobe signal Ø4.

The first strobe signal Ø1 is output at a first toggle time. The second strobe signal Ø2 is output at a second toggle time. The third strobe signal Ø3 is output at a third toggle time. The fourth strobe signal Ø4 is output at a fourth toggle time.

Figure 4:
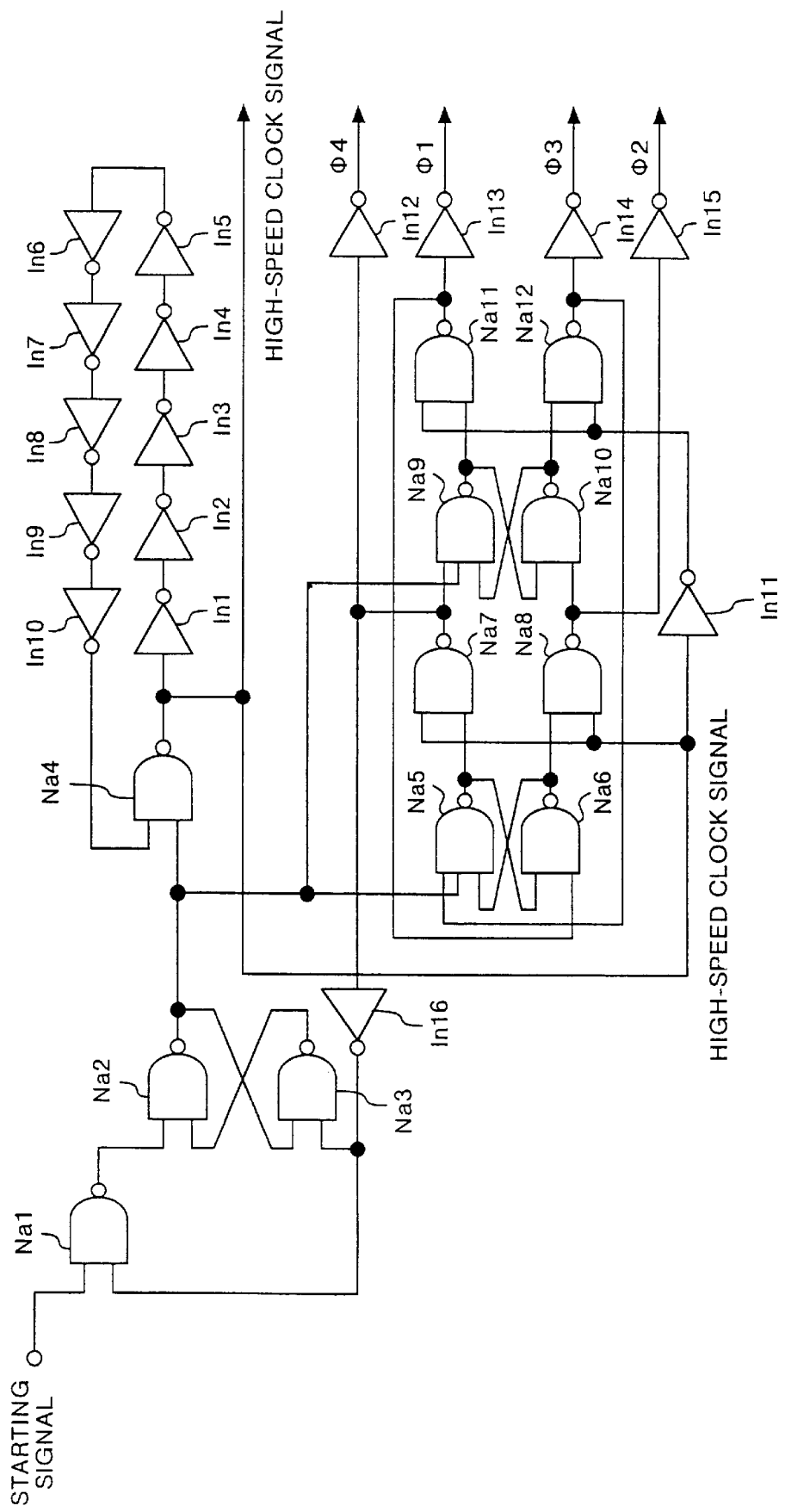
FIG. 4 is a circuit diagram showing one example of a structure of a data burst transfer oscillation circuit in the embodiment.

The circuit diagram in FIG. 4 shows one example of a structure of the data burst transfer oscillation circuit 12. The data burst transfer oscillation circuit 12 consists of twelve NAND gates Na1 to Na12, and sixteen inverters In1 to In16, for example.

The NAND gate Na1 inputs a starting signal and an output signal of the inverter In16, and outputs a NAND logic of these inputs. The input signal of the inverter In16 is an inverted signal of the fourth strobe signal Ø4. In other words, the NAND gate Na1 inputs the starting signal and the fourth strobe signal Ø4, and outputs a NAND logic of these inputs.

The NAND gate Na2 inputs an output signal of the NAND gate Na1 and an output signal of the NAND gate Na3, and outputs a NAND logic of these inputs. The NAND gate Na3 inputs an output signal of the NAND gate Na2 and an output signal of the inverter In16, and outputs a NAND logic of these inputs. These NAND gates Na1 to Na3 and the inverters In16 constitute the control circuit 23.

The NAND gate Na4 inputs an output signal of the NAND gate Na2 and an output signal of the inverter In10, and outputs a NAND logic of these inputs as a high-speed clock signal. The inverter In1 outputs an inverted signal of the output signal of the NAND gate Na4. The inverter In2 outputs an inverted signal of the output signal of the inverter In1. The inverter In3 outputs an inverted signal of the output signal of the inverter In2. The inverter In4 outputs an inverted signal of the output signal of the inverter In3. The inverter In5 outputs an inverted signal of the output signal of the inverter In4.

The inverter In6 outputs an inverted signal of the output signal of the inverter In5. The inverter In7 outputs an inverted signal of the output signal of the inverter In6. The inverter In8 outputs an inverted signal of the output signal of the inverter In7. The inverter In9 outputs an inverted signal of the output signal of the inverter In8. The inverter In10 outputs an inverted signal of the output signal of the inverter In9. The NAND gate Na4 and the inverters In1 to In10 constitute the oscillation circuit 21.

The NAND gate Na5 inputs an output signal of the NAND gate Na2, an output signal of the NAND gate Na6, and an output signal of the NAND gate Na12, and outputs a NAND logic of these inputs. The NAND gate Na6 inputs an output signal of the NAND gate Na5, and an output signal of the NAND gate Na11, and outputs a NAND logic of these inputs.

The NAND gate Na7 inputs an output signal of the NAND gate Na5, and an output signal (a high-speed clock signal) of the NAND gate Na4, and outputs a NAND logic of these inputs. The NAND gate Na8 inputs an output signal of the NAND gate NaG, and an output signal (a high-speed clock signal) of the NAND gate Na4, and outputs a NAND logic of these inputs.

The NAND gate Na9 inputs an output signal of the NAND gate Na2, an output signal of the NAND gate Na7, and an output signal of the NAND gate Na10, and outputs a NAND logic of these inputs. The NAND gate Na10 inputs an output signal of the NAND gate Na8, and an output signal of the NAND gate Na9, and outputs a NAND logic of these inputs.

The NAND gate Na11 inputs an output signal of the NAND gate Na9, and an output signal (a high-speed clock signal) of the NAND gate Na4 that has been inverted by the inverter In11, and outputs a NAND logic of these inputs. The NAND gate Na12 inputs an output signal of the NAND gate Na10, and an output signal of the inverter In11, and outputs a NAND logic of these inputs.

The inverter In12 inverts an output signal of the NAND gate Na7, and outputs a result as the fourth strobe signal Ø4. The inverter In13 inverts an output signal of the NAND gate Na11, and outputs a result as the first strobe signal Ø1. The inverter In14 inverts an output signal of the NAND gate Na12, and outputs a result as the third strobe signal Ø3. The inverter In15 inverts an output signal of the NAND gate Na8, and outputs a result as the second strobe signal Ø2. These NAND gates Na5 to Na12 and the inverters In11 to In15 constitute the frequency divider 22.

The starting signal to be input to the NAND gate Na1 is a pulse signal that is generated based on a data read instruction for reading data from the memory 15a at the data transfer origin (reference FIG. 2). A circuit for generating this pulse signal will be explained next.

Figure 5:
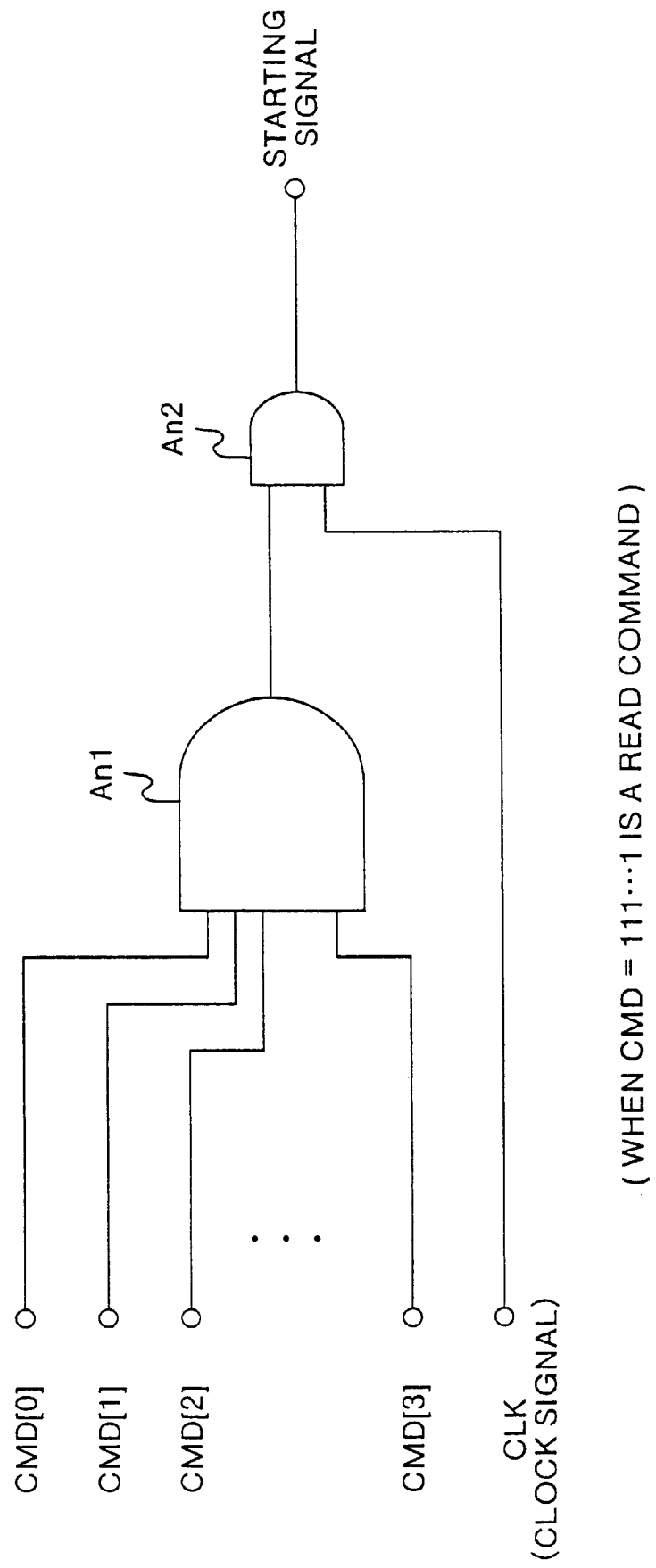
FIG. 5 is a circuit diagram showing one example of a structure of a circuit for generating a starting signal in the embodiment.

FIG. 5 is a circuit diagram showing one example of a structure of the circuit for generating a pulse of the starting signal. When a read instruction corresponds to a bit string of "111 . . . 1", for example, this pulse generating circuit consists of two AND circuits An1 and An2. The AND circuit An1 inputs values of the bits of the read instruction, and outputs an AND logic of these inputs. The AND circuit An2 inputs an output signal of the AND circuit An1 and a clock signal, and outputs an AND logic of these inputs as a starting signal. Therefore, the starting signal is output at a constant timing for the clock signal.

Figure 6:
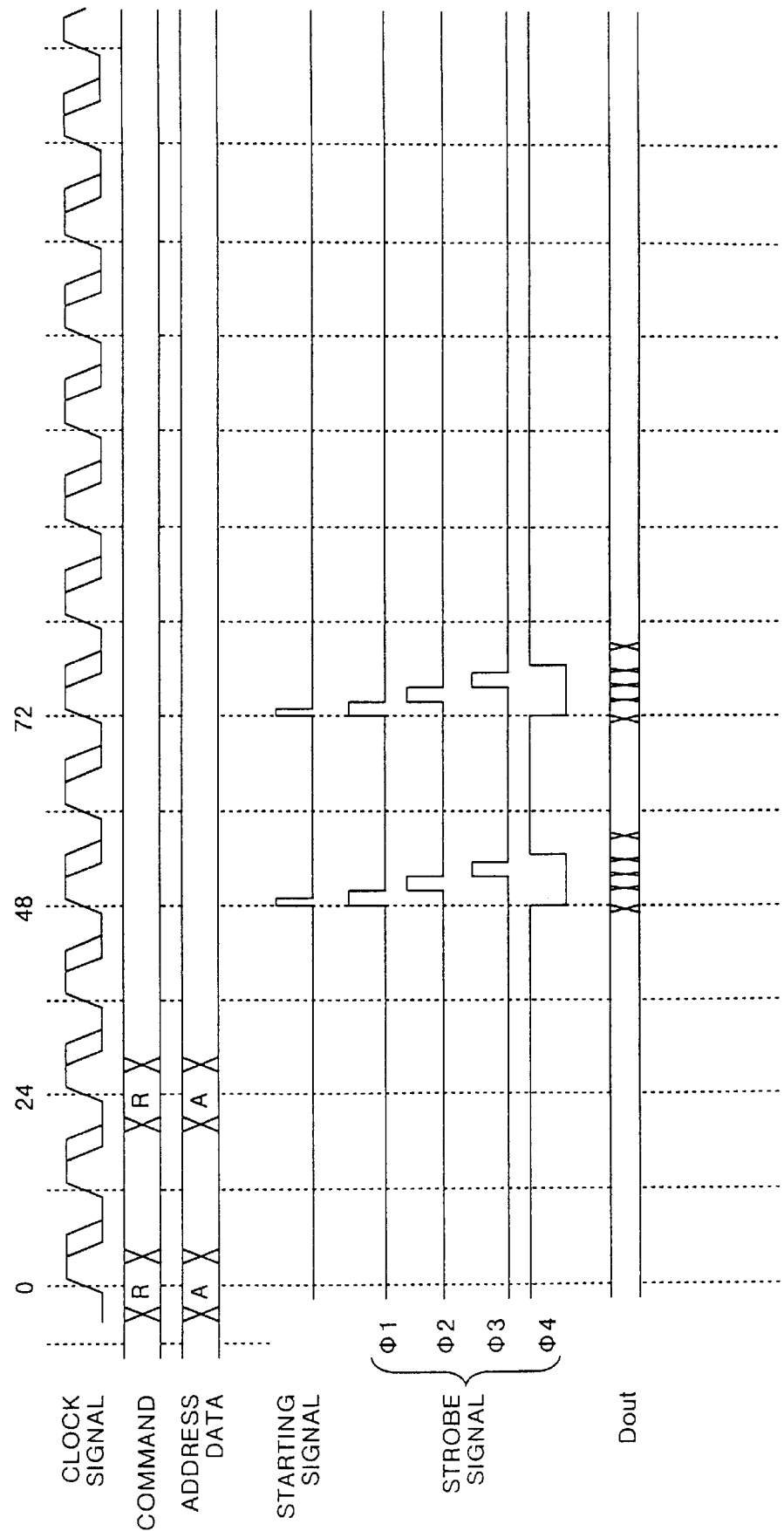
FIG. 6 is a timing chart showing one example of a timing of converting a parallel signal into a serial signal in the embodiment.

A timing of converting a parallel signal of the data output from the memory 15a (reference FIG. 2) into a serial signal will be explained based on the above-described structure. FIG. 6 is a timing chart showing one example of a timing of converting a parallel signal into a serial signal.

When a data read instruction (expressed by R in FIG. 6) for reading data from the memory 15a at the data transfer origin has been issued together with address data (expressed by A in FIG. 6), a starting signal is input from the outside to the data burst transfer oscillation circuit 12 in synchronism with a clock signal. Upon receiving the starting signal, the data burst transfer oscillation circuit 12 outputs four strobe signals Ø1 to Ø4 of mutually different phases.

The parallel-serial conversion circuit 13 converts every four-bit parallel signals of data read from the memory 15a into serial signals in synchronism with the rising edges of the four strobe signals Ø1 to Ø4, and outputs the result as output data (Dout).

While the timing is not shown in FIG. 6, the serial signals obtained by the conversion are transferred to the serial-parallel conversion circuit 14. The serial-parallel conversion circuit 14 then converts the serial signals into parallel signals based on the four strobe signals Ø1 to Ø4. The converted result is written into the memory 15b at the data transfer destination. In this way, the data has been transferred from the memory 15a at the data transfer origin to the memory 15b at the data transfer destination.

Figure 7:
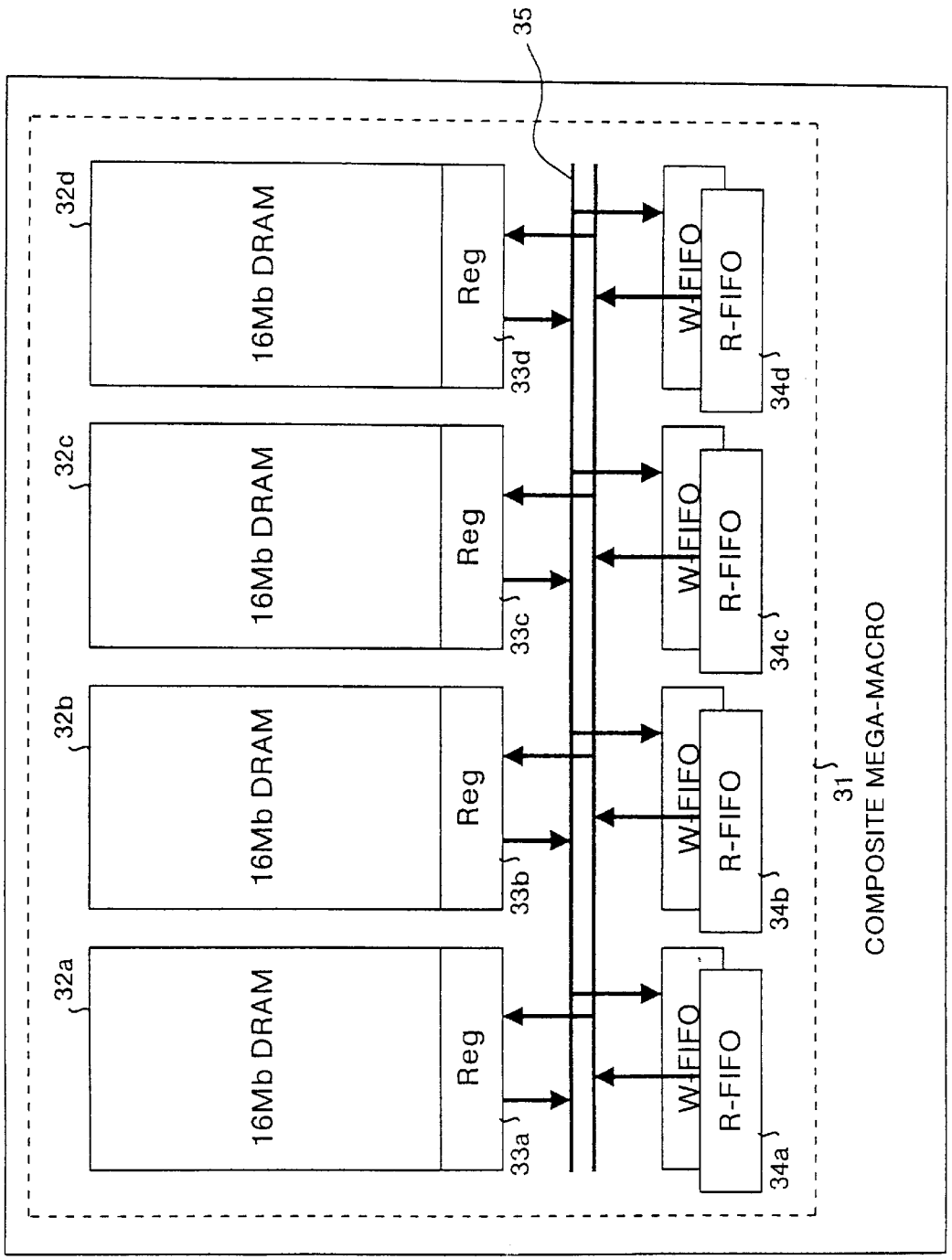
FIG. 7 is a schematic view showing an example of an application of an asynchronous data burst transfer circuit to an actual data transfer between memories relating to the embodiment.

An example of an application of the asynchronous data burst transfer circuit having the above-described structure will be explained next. FIG. 7 is a schematic view showing an example of an application of the asynchronous data burst transfer circuit relating to the embodiment.

In FIG. 7, a reference number 31 denotes a composite mega-macro, and reference numbers 32a, 32b, 32c, and 32d denote 16-Mb DRAMs respectively. Reference numbers 33a, 33b, 33c, and 33d denote registers respectively, reference numbers 34a, 34b, 34c, and 34d denote FIFOs respectively, and a reference number 35 denotes a data bus. Although not shown in the drawing, the asynchronous data burst transfer circuit relating to the present embodiment is applied to a data transfer between the registers 33a, 33b, 33c, and 33d and the FIFOs 34a, 34b, 34c, and 34d.

According to the above-described embodiment, based on m sets of signal line groups L1 and L2 for connecting between the parallel-serial conversion circuit 13, the serial-parallel conversion circuit 14, the signal line L3 for connecting between the two, and the memories 15a and 15b, the parallel-serial conversion circuit 13 converts every four-bit parallel signals of the (4×m)-bit data read from the memory 15a at the data transfer origin into serial signals and transfer the result. The serial-parallel conversion circuit 14 then receives the transferred serial signals, and converts them into the original four-bit parallel signals. The serial-parallel conversion circuit 14 stores the converted result as the original (4×m)-bit data in the memory 15b at the data transfer destination.

Therefore, the number of lines connecting between the memories 15a and 15b is decreased to approximately one quarter of the conventional number of lines required. In other words, as compared with the lines for (4×m)-bit data conventionally required, according to the above embodiment, only the lines for m-bit data for the data transfer and the lines for four-bit data for supplying the strobe signals are necessary. More specifically, while the lines for 256-bit data have been conventionally required, only the lines for (64+4)-bit data, that is, 68-bit data, is required in the above embodiment.

Further, the oscillation circuit 21 generates a high-speed clock signal by oscillating at a higher frequency than that of the reference clock signal. The frequency divider 22 then divides the frequency of this high-speed clock signal, and generates the strobe signals Ø1 to Ø4. Therefore, it is possible to transfer a large-capacity bit data in a short time even when the reference clock signal is at a low speed.

In the above explanation the number of bits for conversion between a parallel signal and a serial signal is assumed as four bits. However, the number of bits is not limited to four. That is, three bits or less than three bits may be used for conversion between a parallel signal and a serial signal. Alternately, five bits or more than five bits, for example, eight bits may also be used for this conversion.

In the above explanation it is assumed that the strobe signals are output in parallel. However, the strobe signals may also be output in series in stead of this.

In the above embodiment, a conversion between parallel signals and serial signals is carried out based on the strobe signals. However, in stead of this, the conversion between parallel signals and serial signals may also be carried out by utilizing a high-speed clock signal output from the oscillation circuit. In this case, this high-speed clock signal is commonly supplied to the parallel-serial conversion circuit and the serial-parallel conversion circuit for transfer of the same data.

Further, in the above explanation a case is assumed in which the data transfer is carried out in one direction. However, it is also possible to install necessary signal lines to make it possible to transfer data in an opposite direction between the parallel-serial conversion circuit and the serial-parallel conversion circuit. In this way, a data transfer may be carried out in both directions between the memories.

Further, in the above explanation a case is assumed in which the oscillation circuit is structured by a logic circuit. However, the oscillation circuit may also be structured by a PLL. When the oscillation circuit is structured by a PLL, when the oscillation period of the oscillation circuit is coincided with the period of the clock signal, it becomes possible to obtain an oscillation circuit with little influence of power source voltage and temperature.

The application of the present invention is not limited to a data transfer between memories. It is also possible to apply the present invention to a data transfer between various kinds of circuits other than memories and a memory. It is also possible to apply the present invention to a data transfer between various kinds of circuits other than memories. Further, for each data transfer, a bit mask signal may be attached to the data for each plurality of bits, for example, for each one byte. Based on this arrangement, the processing of this byte, for example, a writing of this byte, may be prohibited.

As explained above, according to one aspect of the present invention, every n-bit parallel signals of data read from the memory at the data transfer origin are converted into serial signals, which are then transferred. The memory at the data transfer destination converts the received serial signals into n-bit parallel signals, and stores the result as the original data in the memory at the data transfer destination. Therefore, the number of lines connecting between the memories can be decreased to approximately one n-th of the number of lines conventionally required. Further, in the system that has only low-speed clock signals, it becomes possible to transfer a large-capacity bit data in a short time.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data burst transfer circuit comprising:
an oscillation circuit which outputs n (where n is an integer of 2 or above) timing signals of mutually different phases, said oscillation circuit having
a self-oscillation circuit which self-oscillates at a specific frequency;
a frequency divider which outputs the n timing signals based on an output signal of said self-oscillation circuit; and
a control circuit which controls the operation of said self-oscillation circuit and said frequency divider based on a starting signal and a timing signal output from said frequency divider;
one or a plurality of parallel-serial conversion circuits which convert n-bit parallel signals into serial signals based on the n timing signals;
one or a plurality of serial-parallel conversion circuits which convert serial signals into n-bit parallel signals based on the n timing signals;
a signal line which transmits serial signals from the parallel-serial conversion circuits to the serial-parallel conversion circuits; and
a signal line which supplies the n timing signals from said oscillation circuit to said parallel-serial conversion circuits and said serial-parallel conversion circuits respectively.

2. The data burst transfer circuit according to claim 1, wherein
said self-oscillation circuit starts self-oscillation when it receives a start signal;
said frequency divider counts the number of oscillation of said self-oscillation circuit and outputs a stop signal when the count reaches the number n; and
said control circuit provides a control to stop the self-oscillation of said self-oscillation circuit when said frequency divider output the stop signal.

3. The data burst transfer circuit according to claim 1, wherein said oscillation circuit having,
a self-oscillation circuit which self-oscillates at a frequency which is higher than the frequency of a clock signal;

a frequency divider which outputs then timing signals based on an output signal of said self-oscillation circuit; and a control circuit which controls the operation of said self-oscillation circuit and said frequency divider based on a starting signal and a timing signal output from said frequency divider, and wherein said data burst transfer circuit transfers data at a speed which is higher than the speed of the clock signal.

4. The data burst transfer circuit according to claim 3, wherein said self-oscillation circuit starts self-oscillation when it receives a start signal;

said frequency divider counts the number of oscillation of said self-oscillation circuit and outputs a stop signal when the count reaches the number n; and said control circuit provides a control to stop the self-oscillation of said self-oscillation circuit when said frequency divider output the stop signal.

5. The data burst transfer circuit according to claim 1, wherein said parallel-serial conversion circuit converts data read from a memory chip or a memory circuit into serial data, and said serial-parallel conversion circuit outputs data converted into parallel data to a memory chip or a memory circuit.

6. The data burst transfer circuit according to claim 5, wherein the starting signal is a pulse signal generated based on a data read instruction for reading data from said memory chip or said memory circuit.

7. The data burst transfer circuit according to claim 5, wherein said oscillation circuit commonly supplies the n timing signals to said plurality of parallel-serial conversion circuits that convert one data read from a memory chip or a memory circuit into serial signals.

8. The data burst transfer circuit according to claim 2, wherein said oscillation circuit receives as the starting signal a signal that is output at a constant timing.

9. The data burst transfer circuit according to claim 3, wherein said oscillation circuit receives as the starting signal a signal that is output at a constant timing.

10. The data burst transfer circuit according to claim 5, wherein said oscillation circuit receives as the starting signal a signal that is output at a constant timing.

* * * * *